United States Patent [19]
Lovendahl

[11] 3,739,442
[45] June 19, 1973

[54] CUTTING TOOLS

[76] Inventor: Norman H. Lovendahl, 814 Clinton, River Forest, Ill. 60305

[22] Filed: Dec. 27, 1971

[21] Appl. No.: 212,115

[52] U.S. Cl............................................. 29/105 R
[51] Int. Cl.............................................. B26d 1/12
[58] Field of Search.................................. 29/105 R

[56] References Cited
UNITED STATES PATENTS

| | | | |
|---|---|---|---|
| 3,273,222 | 9/1966 | Begle | 29/105 R |
| 3,315,332 | 4/1967 | Lowry et al. | 29/105 R |
| 3,195,376 | 7/1965 | Bader | 29/105 R |
| 3,566,496 | 3/1971 | Kezirian | 29/105 R X |

Primary Examiner—Leonidas Vlachos
Attorney—Hugh L. Fisher

[57] ABSTRACT

A cutting tool having a rotatable cutter body provided with spaced apart slots around its periphery. In each slot a cutter blade is accurately positioned by an anvil and a locating spacer and then locked into place by a wedge. The locating spacers provide a maximum support area for the cutter blades and are prevented from turning by a shoulder on its locating surface. Also the locating spacers can be of different sizes and selected to accurately control the cutting tool location dimensions.

3 Claims, 7 Drawing Figures

PATENTED JUN 19 1973
3,739,442
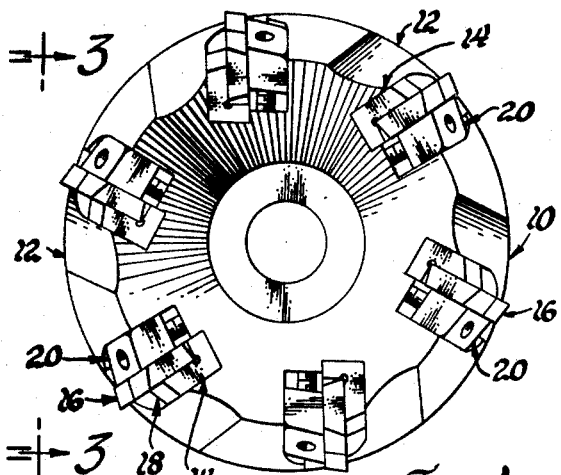
Fig.1
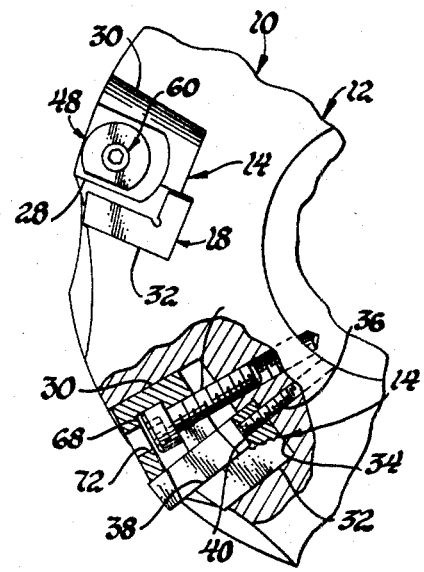
Fig.2
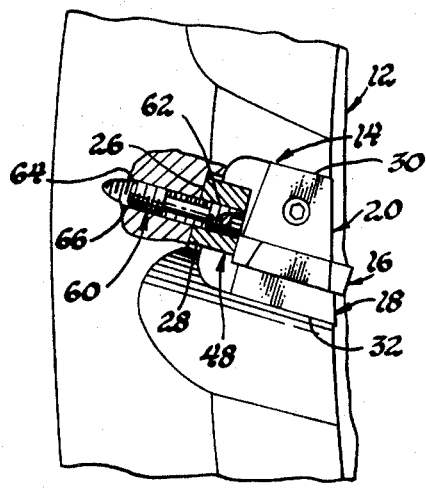
Fig.3
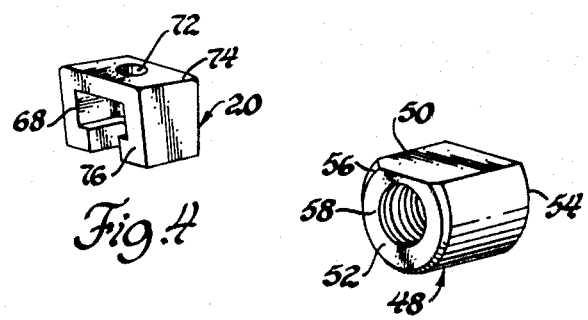
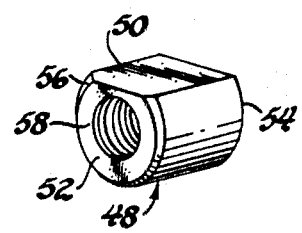
Fig.5
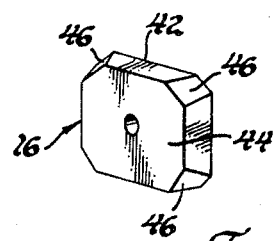
Fig.6
Fig.7
INVENTOR.
Norman H. Lovendahl
BY
Hugh L. Fisher
ATTORNEY

CUTTING TOOLS

This invention relates to improvements in cutting tools adapted for use, although not exclusively, as milling cutters.

The rotatable cutter body for a cutting tool usually has machined in it the various cutter blade locating surfaces which determine rake angles, runout, etc. This body is conventionally formed of a heat treated hard alloy steel and is necessarily the most expensive part of the cutting tool assembly. If during operation or even assembly, any of these various locating surfaces become damaged, then the cutter body frequently must be discarded.

With the foregoing in mind, a cutting tool is contemplated which incorporates the various cutter blade locating surfaces in easily replaceable separate parts that afford maximum and very accurate support for the cutter blades.

Also contemplated is a cutting tool that utilizes, for determining cutter blade position, locating spacers that provide for increased area of blade support; that are prevented from turning; that can only be assembled in one way which is the proper way; that can be easily replaced; and that can be made of different sizes and then selected to achieve desired dimensions either during initial assembly or when replacement or repair is required.

The foregoing and other objects and advantages of the invention will become apparent from the following description and from the accompanying drawings, in which:

FIG. 1 is a side elevational view of a cutting tool incorporating the principles of the invention;

FIG. 2 is an enlarged fragmentary partially in section view of the FIG. 1 cutting tool looking in the direction arrows 3—3;

FIGS. 4, 5 and 6 are perspective views respectively of a wedge, a locating spacer, and a cutting blade employed in the FIG. 1 cutting tool; and FIG. 7 is a sectional view of an alternative locating spacer.

Considering first FIG. 1, a cutting tool denoted by the numeral 10 is, for demonstration purposes only, shown to be of the milling type. The cutting tool 10 has a cutter body provided with a series of spaced apart, outwardly opening, slots 14 extending around the periphery of cutter body 12. Positioned within each of these slots 14 are cutter blades denoted at 16, which are partially supported by L-shaped blade anvils 18 and held in position by locking wedges 20. When the cutting tool 10 is rotated, the cutter blades 16 remove metal or whatever other type material is being machined in the well known way.

To provide for the drive attachment of the cutting tool 10 to the drive shaft (not shown), the cutter body 12 is provided with a through bore 22 and a counter bore 24. The drive connection, of course, is subject to considerable variation determined by the application of the cutting tool 10. Also to achieve durability, the cutter body 12 is formed of a high alloy steel and heat treated to obtain the desired hardness. Therefore, as mentioned, any damage to these slots during operation can result in irreparable damage to the cutter body 12, which is the most expensive part of the cutting tool 10.

Referring now to FIGS. 2 and 3, the slots 14 each have a bottom surface at 26 (see FIG. 3) which has a shoulder 28 laterally extending from this bottom surface 26. The slots 14 are further defined by confronting side surfaces 30 and 32 and are intermediate or interconnecting side surface 34 all of which are laterally extending from the proximity of the bottom surface 26. These surfaces 30, 32 and 34 are held to relatively close dimensions and serve a function to be explained.

The L-shaped blade anvils 18, best shown in FIG. 2, are detachably secured by a screw 36 to the cutter body 12 and in engagement with the surfaces 32 and 34. Each blade anvil 18, in turn has blade locating or supporting surfaces 38 and 40 which are held to close dimensions and support the cutter blades 16 as shown on FIG. 2. The anvils 18 are made of a heat treated high alloy steel and are replaceable, either because damaged, or because it is to use a different type of cutter blade requiring a different anvil. This avoids the problem encountered when the cutter blades 16 are located directly against surfaces 32 and 34 of the cutter body 12 instead of through the intermediary of an anvil, or if these cutter body surfaces 32 and 34 are damaged during machining, then the mentioned problem of irreparable damage to the cutter body 12 can arise.

The cutter blades 16 may be of many different types, of many diverse shapes, and also of different materials. For the purposes of demonstration only, the cutter blades 16 are shown to be of the replaceable indexable type, octagonal shaped, and made of a tungsten carbide material. As viewed in FIG. 6, the blades 16 have opposing parallel faces 42 and 44 and a series of cutting edges 46 along and partially defining the face 44. The cutter blades 16 each are installed so that the faces 44 engages the anvil locating surface 38 and one of the edges engages the anvil surface 40. If one of the cutting edges 46 becomes damaged or dull, the cutter blade 16 is merely indexed or rotated to the next cutting edge 46. If the cutter blade 16 is irreparably damaged, it is easily and conveniently replaced.

As shown in FIG. 3, the cutter blades 16 also rest against a locating spacer, designated generally by the numeral 48. The locating spacers 48, as viewed in FIG. 5, are cylindrically shaped with a flat surface at 50 along one side and opposing faces 52 and 54. When installed as shown in FIG. 3, the flat surface 50 is opposite the shoulder 28 and the face 52 engages the bottom surface 26. It will be noted that the surface 52 is provided with a chamber 56; hence, the bottom surface 26 does not require sharp corners, which is always a heat treating problem. This is optional with respect to the surface 54 because it is not in engagement with the bottom surface 26.

For facilitating the retention of the locating spacer 48 in the FIG. 3 position, the locating spacer 48 is provided with a through threaded hole 58, which without limitation, will be assumed to have left hand threads. The actual retention is by a differential screw 60 that has a threaded socket end at 62 which at assembly is partially threaded into the threaded hole 58. The differential screw 60 has an opposite end 64 provided with an opposite hand thread; in this instance, a right hand thread. Therefore, when an allen wrench (not shown) is inserted in the socket end 62 and rotated to the right or clockwise, the differential screw 60 will advance into a threaded hole 66 in the cutter body 12 and at the same time, move the locating spacer 48 in tight fixed engagement with the bottom surface 26. This is facilitated by the rotation prevention afforded by the flat surface 50 on the locating spacer 48 and the shoulder 28 of the bottom surface 26 which prevents the rotation (see upper part of FIG. 2).

If desired and to insure that the face 52 with the chamber 56 is always in engagement with the bottom surface 26, the threads in the threaded hole 58 on the side defined by the face 54 can be made incomplete or deformed to insure the socket end 62 can not be inserted in this end. This insures that the assembly is always made in one way.

When in the FIG. 3 position the face 54 of the locating spacer 48 engages the edge of the cutter blade 16 and determines the extent that the cutter blade 16 extends from the cutter body 12. These locating spacers 48 can have different dimensions between the faces 52 and 54 to accommodate tolerance variations or to gain greater accuracy.

The flat surface 50 on the locating spacer 48 not only combines with the shoulder 28 to prevent rotation of the locating spacer 48 during assembly, but also during operation the spacer 48 cannot turn and become disengaged. Additionally the flat surface 50, as shown in the upper part of FIG. 2, enables the locating spacer 48 to present a greater area for supporting the edge of the cutter blade 16. For instance, without this flat surface 50, the locating spacer 48 would have to be displaced upwardly as viewed in FIG. 2 and leave only a small edge of the face 52 for support. This is achieved while permitting the locating spacer 48 to be removed from the cutter body slots 14 without removing the blade anvils 18. Otherwise, if the locating spacer 48, as viewed in FIG. 2, was moved downwardly, it would be underneath the anvil 18 and the slot 14 would have to be considerably altered to permit lateral removal.

As an alternative a locating spacer 48 shown in FIG. 7 can This used. Tis locating spacer 48 has a counter bored hole 67 for accommodating a conventional spocket head cap screw (not shown) instead of the differential screw 60.

The locking wedges 20, as illustrated in FIG. 3, lock the cutter blade 16 into position against the locating spacer 48 and against the anvil blade surfaces 38 and 40. These wedges 20 have a T-shaped slot 68 to accommodate a socket head screw 70 or the like. To permit the entrance of an allen wrench end, a thru hole 72 is provided at the top of the T-slot 68, which extends to the exterior of the locking wedge 20. The locking wedge 20 is formed of a heat treated alloy steel and has opposing faces 74 and 76 alined to respectively engage the side 30 of the slot 14 and the face 42 of the cutter blade 16. The installation is made by inserting the allen wrench in the hole 72 after the socket end screw 70 is installed. Then, as viewed in FIG. 2, the socket head screw 70 is threaded into the cutter body 12 until the locking wedge 20 is securely in position. The locking wedge surface 76 is provided with a certain angle taper; e.g., 7°, to provide self-locking and thus, insure that there can be no unintended separation of the cutting blade 16 from the slot 14.

From the foregoing it will be appreciated that the anvils 18 provide the cutter blade locating surfaces for establishing the desired rake angles and the locating spacers 48 provide the locating surface the desired runout. These represent the most important dimensions for the cutting tool 10 and are controlled by replaceable part; namely, the locating spacers 48 and the L-shaped anvils 18. Also the locating spacers 48 provide a larger area for support for the cutter blade 16 and are prevented from rotating so as to prevent separation during operation and provide ease of assembly.

What is claimed is:

1. In combination; a rotatable cutter body having a plurality of slots spaced around the periphery of the cutter body and opening outwardly therefrom, each slot being defined by a plurality of locating surfaces including a bottom surface having a shoulder laterally extending therefrom, confronting side surfaces laterally extending from the bottom surface, and an intermediate side surface extending laterally from the bottom surface and being positioned between the confronting side surfaces; a plurality of L-shaped anvils one detachable positioned in each slot and in engagement with one of the confronting side surfaces and the intermediate side surface, the anvils each having adjacent blade locating surfaces; a plurality of indexable cutter blades each having opposed parallel faces and a plurality of edges provided with cutting surfaces, one of the plurality of cutter blades being positioned in each slot so as to extend edgewise therein with an adjacent edge thereof and one face thereof in engagement respectively with the locating surfaces on a respective one of the anvils; a plurality of blade locating members one positioned in each slot, each blade locating member having opposed substantially parallel flat faces, a threaded hole therein extending between the faces and a substantially flat side surface; screw means removably retaining one of the plurality of blade locating members in each slot so that the opposite faces of each blade locating member engage respectively the bottom surface and one of the edges of a respective one of the cutter blades and the flat side surface is positoned adjacent to and engagable with the bottom surface shoulder to prevent turning of the locating member and to project the cutting surface of the cutting blade a certain distance outside the slot; a plurality of wedge members one positioned in each slot, each wedge member having a T-shaped slot therein provided with an external opening extending therefrom, a tapered surface engagable with the other face of a respective one of the cutter blades and an opposite surface engagable with the other of the confronting side surfaces of the associated slot, the tapered surface being at a certain angle so as to form a self-locking relationship with the respective cutter blade; and screw means received by the T-shaped slot and threadily engagable with the cutter body for retaining the wedge member in the self-locking relationship with the respective cutter blade.

2. A cutting tool composing a rotatable cutter body having a plurality of slots spaced around the cutter body and opening outwardly therefrom, each slot being defined by a plurality of locating surfaces including a bottom surface, confronting side surfaces laterally extending from the bottom surface, and an intermediate side surface extending laterally from the bottom surface and being positioned between the confronting side surfaces, the bottom surface having a shoulder laterally extending therefrom and substantially parallel to and spaced from one of the confronting side surfaces; each slot having positioned therein an anvil detachably secured to the cutter body and in engagement with one of the confronting side surfaces and the intermediate side surface, the anvil having adjacent blade locating surfaces; a cutter blade having opposed parallel faces and opposite edges provided with cutting surfaces, the cutter blade being positioned in the slot so as to extend edgewise therein with an adjacent edge thereof and one face thereof in engagement respectively with the locating surfaces on the anvil; a blade locating member positioned on the bottom surface of the slot and having a cylindrical like configuration provided with opposed substantially parallel flat faces, a threaded hole therein extending between the faces, and a substantially flat side surface; differential screw means removably retaining the blade locating member in the slot so that the opposite faces of the blade locating member engage respectively the bottom surface and one of the edges of the cutter blade and the flat side surface engages the bottom surface shoulder to prevent turning of the locating member and to cause the cutting surface on the cutter blade to project from the slot a certain distance; a wedge member having a T-shaped slot therein provided with an external opening extending therefrom, a tapered surface engagable with the other face of the cutter blade and an opposite surface engagable with the other of the confronting side surfaces of the slot, the tapered surface being at a certain angle so as to form a self-locking relationship with the cutter blade; and screw means received by the T-shaped slot and threadily engaged with the cutter body for retaining the wedge member in the self-locking relationship with the cutter blade.

3. A cutting tool comprising a rotatable cutter body having a plurality of slots spaced around the cutter body and opening outwardly therefrom each slot being defined by plurality of locating surfaces including the bottom surface having a shoulder laterally extending therefrom confronting side surfaces laterally extending from the bottom surface and another side surface laterally from the bottom surface and being positioned between the confronting side surfaces an anvil detachably positioned in the slot and an engagement with one of the confronting side surfaces and the intermediate side surface, the anvil having adjacent blade locating surfaces; blade locating member positioned on the bottom surface of the slot and having a threaded hole therein permitted threaded entrance in one end thereof only and a substantially flat side surface; a cutter blade positioned on the anvil blade locating surfaces for establishing predetermined rake angles and having an end thereof in engagement with the blade locating member and the opposite end thereof provided with a cutting edge extending from the slot a certain distance determined by the locating member; a differential screw having a certain hand threaded end engaged with the opposite end of the hole in removably retaining the blade locating member and a certain opposite hand threaded end engaged with the cutter body to removably retain the blade locating member in place against the bottom respectively with the bottom surface and the flat side surface engaged with the bottom surface shoulder to prevent turning of the locating member; a wedge member detachably secured to the cutter body and having a tapered surface engagable with the cutter blade and an opposite surface engagable with the confronting side surfaces of the slot, the tapered surface being at a certain angle so as to form a self-locking relationship with the cutter blade.

* * * * *